(12) United States Patent
Miura

(10) Patent No.: US 6,191,869 B1
(45) Date of Patent: Feb. 20, 2001

(54) FACSIMILE MACHINE

(75) Inventor: Toshiya Miura, Kyoto (JP)

(73) Assignee: Sharp Kabushiki Kaisha, Osaka (JP)

( * ) Notice: Under 35 U.S.C. 154(b), the term of this patent shall be extended for 0 days.

(21) Appl. No.: 09/439,852

(22) Filed: Nov. 15, 1999

Related U.S. Application Data

(63) Continuation-in-part of application No. 08/914,938, filed on Aug. 20, 1997, now abandoned.

(30) Foreign Application Priority Data

Aug. 27, 1996 (JP) .................................................. 8-224699

(51) Int. Cl.⁷ ...................................................... H04N 1/32
(52) U.S. Cl. ............................................................ 358/442
(58) Field of Search ..................................... 358/434, 437, 358/439, 442, 468; 379/93.09, 100.01, 100.06, 100.15, 100.16, 100.17, 393

(56) References Cited

U.S. PATENT DOCUMENTS

| | | |
|---|---|---|
| 4,353,097 | 10/1982 | Takeda et al. . |
| 4,524,244 | 6/1985 | Faggin et al. . |
| 5,315,643 | 5/1994 | Yoshida et al. . |
| 5,444,771 | 8/1995 | Ohnishi . |
| 5,619,565 | 4/1997 | Cesaro et al. . |
| 5,761,283 | 6/1998 | Chung . |

FOREIGN PATENT DOCUMENTS

| | | |
|---|---|---|
| 0313313 | 4/1989 | (EP) . |
| 0396105 | 7/1990 | (EP) . |
| 0454452 | 10/1991 | (EP) . |
| 0555150 | 8/1993 | (EP) . |
| 63-048043 | 2/1988 | (JP) . |
| 2135966 | 5/1990 | (JP) . |
| 4063052 | 2/1992 | (JP) . |
| 4220055 | 8/1992 | (JP) . |
| 4307850 | 10/1992 | (JP) . |

Primary Examiner—Joseph Mancuso
Assistant Examiner—F. E. Cooperrider

(57) ABSTRACT

A facsimile machine which includes a telephone conversation function that can securely shift the facsimile communication mode to a telephone conversation mode after facsimile communication, even if an error occurs during facsimile communication. This is accomplished without using a telephone conversation reservation function. At a point where after facsimile communication is started, facsimile communication may be stopped after the transmission of predetermined signals between the calling party side facsimile machine and the receiving party side facsimile machine, or due to error. In the case where a communication error occurs because of paper jamming, the main controller keeps occupying the communication line occupied by the line controller, and a signal sound on the occupied communication line is externally emitted by the speaker. When the calling party recognizes that the receiving party requests a call, which is based on the signal sound transmitted from the communication line and externally emitted by the speaker the calling party lifts the handset. The lifting of the handset is then detected by the hook switch. After detection by the hook switch, the main controller controls the line controller to enable conversation with the receiving party side facsimile machine via the handset.

12 Claims, 15 Drawing Sheets

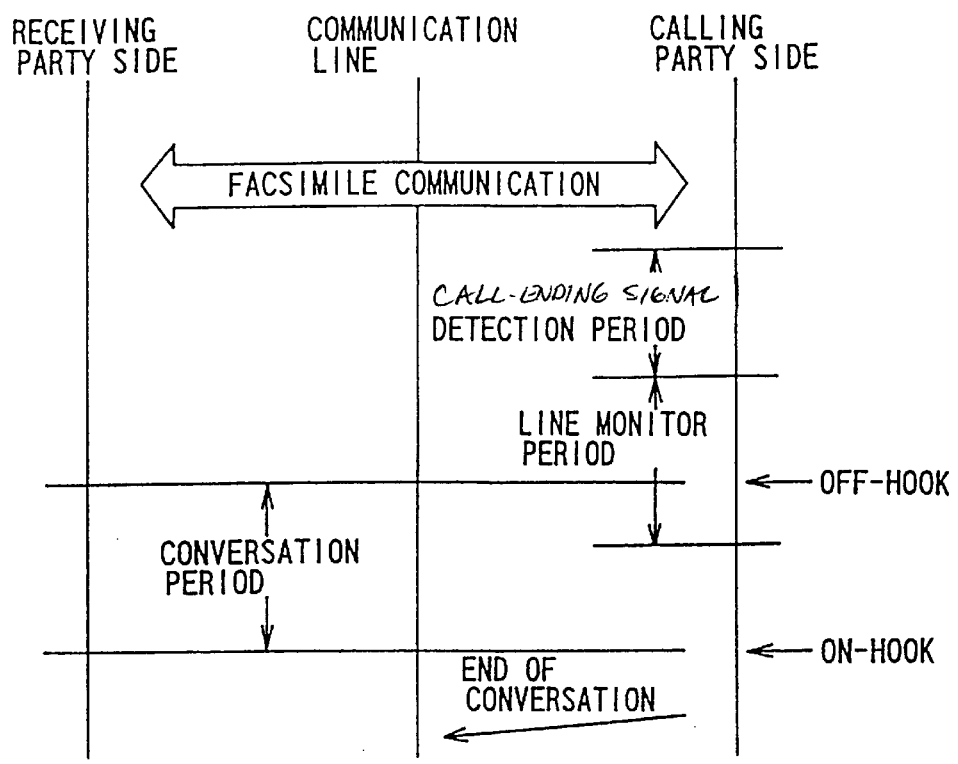
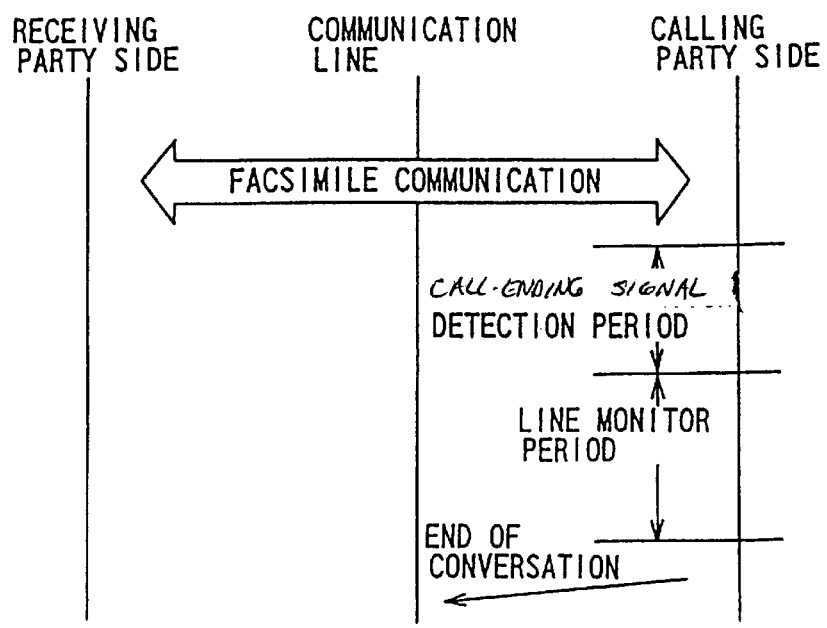

FIG. 20

| AUDIBLE TONE | ITEM | STANDARD | | | |
|---|---|---|---|---|---|
| DIAL TONE (DT) | SIGNAL SENDING FORMAT | | FREQUENCY | IMPULSE RATIO | MAKE RATIO |
| | | | 400±20Hz | CONTINUOUS SIGNAL | |
| | SENDING LEVEL | WITHIN A RANGE OF (-22-L)dBm TO -19dBm | | | |
| RING BACK TONE (RBT) | SIGNAL SENDING FORMAT | 1 second / 3 seconds | FREQUENCY | IMPULSE RATIO | MAKE RATIO |
| | | | A MODULATION OF 400±20Hz BY SIGNAL WITHIN A RANGE OF 15Hz TO 20Hz (modulation degree: 85±15%) | 20 IPM ±20% | 38±10% |
| | SENDING LEVEL | WITHIN A RANGE OF (-29-L)dBm TO -4dBm | | | |
| BUSY TONE (BT) | SIGNAL SENDING FORMAT | 0.5 sec. / 0.5 sec. / 3 seconds | FREQUENCY | IMPULSE RATIO | MAKE RATIO |
| | | | 400±20Hz | 60 IPM ±20% | 50±10% |
| | SENDING LEVEL | WITHIN A RANGE OF (-29-L)dBm TO -4dBm | | | |

L: TRANSMISSION LOSS OF SUBSCRIBER LINE IN 400Hz     IPM: THE NUMBER OF IMPULSE PER MINUTE

FACSIMILE MACHINE

This application is a continuation-in-part of application Ser. No. 08/914,938 filed on Aug. 20, 1997 abandoned, the entire contents of which are hereby incorporated by reference.

BACKGROUND OF THE INVENTION

1. Field of the Invention

The present invention relates to a facsimile machine provided with a telephone conversation function.

2. Description of the Related Art

Conventionally, a protocol for telephone conversation reservation (telephone conversation reservation function) has been available for facsimile machines provided with a telephone conversation function. In a facsimile machine provided with such a telephone conversation reservation function, when a telephone conversation reservation is made by a predetermined procedure at either a calling party side terminal or a receiving party side terminal during facsimile communication, the terminal generates a calling sound after facsimile communication. When either party of the terminals responds to the calling sound and lifts the handset, the facsimile communication mode of the terminal is shifted to the telephone conversation mode, and telephone conversation can be carried out between the calling party side and the receiving party side.

However, in the above-mentioned conventional facsimile machine provided with a telephone conversation function, a telephone conversation reservation function is required at both the calling and receiving party side terminals in order to shift the facsimile communication mode to the telephone conversation mode after facsimile communication. Therefore, terminals whose modes can be shifted to the telephone conversation mode after facsimile communication by telephone conversation reservation are limited in number. For example, when the receiving party side terminal is not provided with the telephone conversation reservation function, the calling party side must make a call again to confirm whether transmitted images have been received properly by the receiving party side, or the receiving party side must make a call to the calling party side. As a result, troublesome operation is required at the calling or receiving party side. In addition, extra charges are required.

Even when the telephone conversation reservation function is provided at both the calling and receiving party side terminals, if an error or the like occurs during facsimile communication, shifting to the telephone conversation mode cannot be attained. Therefore, if an error occurs during facsimile communication and images cannot be received properly, the calling party side must make a call again to the receiving party side, or the receiving party side must make a call to the calling party side. As a result, troublesome operation is required at the calling or receiving party side. In addition, extra charges are required.

SUMMARY OF THE INVENTION

An object of the invention is to provide a facsimile machine capable of securely shifting the facsimile communication mode to the telephone conversation mode after facsimile communication even if an error occurs during facsimile communication, without needing a telephone conversation reservation function.

In order to attain the above-mentioned object, in a first aspect of the invention a facsimile machine having a telephone conversation function comprises sound emitter for externally emitting a signal sound transmitted through a communication line, and a controller for maintaining occupation of the communication line for a predetermined time after facsimile communication, and for controlling the sound emitter to externally emit the signal sound transmitted through the communication line.

According to the first aspect of the invention, the controller maintains the occupation of the communication line for a predetermined time after facsimile communication, and the sound emitter externally emits the signal sound transmitted through the communication line, whereby the calling party side can easily recognize whether the receiving party side requests a call or not. Furthermore, in this state, shifting to the telephone conversation mode can be attained by performing simple operation such as lifting the handset. Therefore, even when no telephone conversation reservation function is available at the calling or receiving party side, and even if an error occurs during facsimile communication, shifting to the telephone conversation mode after the facsimile communication can be attained securely.

In a second aspect of the invention, a facsimile machine having a telephone conversation function comprises a detector for detecting a call-ending signal generated in response to a receiving party side terminal releasing a communication line (i.e., ending conversation by hanging up), a sound emitter for externally emitting a signal sound transmitted through a communication line, and a controller for maintaining occupation of the communication line until the detector detects the call-ending signal after facsimile communication, and for controlling the sound emitter to externally emit the signal sound transmitted through the communication line.

According to the second aspect of the invention, the controller maintains the occupation of the communication line until the detector detects the call-ending signal due to the receiving party side releasing a communication line (i.e., ending conversation by hanging up) after facsimile communication, and the sound emitter externally emits the signal sound transmitted through the communication line, whereby the calling party side can easily recognize that the receiving party side requests a call. Furthermore, in this state, shifting to the telephone conversation mode can be attained by performing a simple operation such as lifting the handset. Moreover, the calling party side can end communication immediately when the receiving party side does not request any call.

In a third aspect of the invention, a facsimile machine having a telephone conversation function comprises a detector for detecting a call-ending signal generated in response to a receiving party side terminal releasing a communication line, a calling device for externally emitting a calling sound, and a controller for maintaining occupation of the communication line until the detector detects the end of conversation on the receiving party side after facsimile communication and for controlling the calling device to externally emit the calling sound.

According to the third aspect of the invention, the controller maintains the occupation of the communication line until the detector detects the call-ending signal due to the receiving party side terminal releasing the communication line after facsimile communication, and the calling device externally emits a calling sound, whereby the calling party side can easily recognize that the receiving party side requests a call. Furthermore, in this state, shifting to the telephone conversation mode can be attained by performing a simple operation such as lifting the handset. Moreover, the calling party side can end communication immediately when the receiving party side does not request any call.

According to the second or third aspect of the invention, even when the calling party side or the receiving party side has no telephone conversation function, or even when an error occurs during facsimile communication, shifting to the telephone conversation mode can be attained securely after facsimile communication. Furthermore, the calling party side can end communication immediately, when the receiving party side does not require any call after facsimile communication. Accordingly, it is possible to avoid useless occupation of the communication line and extra communication charges.

In a fourth aspect of the invention, the facsimile machine comprises a sound output device for outputting a sound indicating that the calling party is being called, wherein the controller for transmitting the sound from the sound output device maintains the communication line until the detector detects the call-ending signal generated in response to the receiving party side terminal releasing the communication line after facsimile communication.

According to the fourth aspect of the invention, the controller maintains the occupation of the communication line until the detector detects the call-ending signal generated in response to the receiving party side releasing the communication line after facsimile communication, and the sound output device externally emits a sound, and the controller sends a sound indicating that the calling party is being called to the communication line being maintained, whereby the calling party can easily recognize that the receiving party requests a call, and the receiving party can also easily recognize that the calling party is being called. Therefore, the receiving party side can be free from anxiety when calling the calling party.

In a fifth aspect of the invention, the controller transmits a calling sound generated by the calling device to the communication line being maintained, until the detector detects the call-ending signal generated in response to the receiving party side terminal releasing the communication line after facsimile communication.

According to the fifth aspect of the invention, the controller maintains the occupation of the communication line until the detector detects the call-ending signal generated in response to the receiving party side releasing the communication line after facsimile communication, and the calling device externally emits a calling sound. Furthermore, the controller transmits a calling sound generated by the calling device to the communication line being maintained, whereby the calling party side can easily recognize that the receiving party side requests a call, and the receiving party side can also easily recognize that the calling party is being called. Therefore, the receiving party side can be free from anxiety when calling the calling party.

In a sixth aspect of the invention, when the telephone conversation function is not activated until the detector detects the call-ending signal generated in response to the receiving party side terminal releasing the communication line after facsimile communication, the controller releases the communication line after the lapse of a predetermined time, and controls the calling device to stop generating the calling sound.

According to the sixth aspect of the invention, the controller maintains occupation of the communication line until the detector detects the call-ending signal, and the calling device externally emits a calling sound. At this time, if shifting to the telephone conversation mode is not attained within a predetermined time, the controller releases the communication line, and controls the calling device to stop externally emitting the calling sound. Thus, if shifting to the telephone conversation mode is not attained within the predetermined time, the communication can be stopped automatically. Accordingly, it is possible to avoid useless occupation of the communication line and extra transmission charges.

In a seventh aspect of the invention, when the telephone conversation function is not activated until the detector detects the call-ending signal in response to the receiving party side terminal releasing the communication line after facsimile communication, the controller releases the communication line after the lapse of a predetermined time, and controls the sound output device to stop the sound output.

According to the seventh aspect of the invention, the controller maintains occupation of the communication line until the detector detects the call-ending signal, and the sound output device externally emits a sound. At this time, if shifting to the telephone conversation mode is not attained until a predetermined time elapses, the controller releases the communication line, and controls the sound output device to stop delivering the sound. Thus, if shifting to the conversation mode is not attained within a predetermined time, the communication can be stopped automatically. Accordingly, it is possible to avoid useless occupation of the communication line and extra transmission charges.

In an eighth aspect of the invention, a facsimile machine comprises a phone-answering device for recording signal sounds transmitted through the communication line, wherein when the telephone conversation function is not activated until the detector detects the call-ending signal generated in response to the receiving party side terminal releasing the communication line after facsimile communication, the controller controls the calling device to stop generating the calling sound, and also controls the phone-answering device to record signal sounds transmitted through the communication line.

According to the eighth aspect of the invention, the controller maintains occupation of the communication line until the detector detects the call-ending signal, and the calling device externally emits the calling sound. At this time, if shifting to the telephone conversation mode is not attained until a predetermined time elapses, the phone-answering device records signal sounds transmitted through the communication line having been occupied, whereby when the receiving party side requests a call but the calling party side cannot answer the request, the phone-answering device can record a message transmitted from the receiving party side. Therefore, even when the calling party is away from the machine, the calling party can securely receive the message from the receiving party side. In addition, it is possible to avoid useless occupation of the communication line and extra transmission charges.

In a ninth aspect of the invention a facsimile machine comprises a phone-answering device for recording signal sounds transmitted through the communication line, wherein when the telephone conversation function is not activated until the detector detects the call-ending signal generated in response to the receiving party side terminal releasing the communication line after facsimile communication, the controller controls the sound output device to stop delivering the sound output, and also controls the phone-answering device to record signal sounds transmitted through the communication line.

According to the ninth aspect of the invention, the controller maintains occupation of the communication line until the detector detects the call-ending signal, and the sound output device externally emits a sound. At this time, if shifting to the telephone conversation mode is not attained until a predetermined time elapses, the phone-answering device records signal sounds transmitted through the communication line having been occupied, whereby when the receiving party side requests a call but the calling party side cannot answer the request, the phone-answering device can record a message from the receiving party side. Therefore, even when the calling party is away from the machine, the calling party can securely receive the message from the receiving party side. In addition, it is possible to avoid useless occupation of the communication line and extra transmission charges.

In a tenth aspect of the invention the phone-answering device sends a predetermined message to the communication line before recording signal sounds transmitted through the communication line.

According to the tenth aspect of the invention when the detector does not detect the call-ending signal generated in response to the receiving party side releasing the communication line after facsimile communication, the phone-answering device transmits a predetermined message to the communication being maintained, and records signal sounds transmitted through the communication line after the transmission of the predetermined message. Thus, when the receiving party side requests a call, the receiving party side can recognize that message recording is possible, and a message transmitted by the receiving party side can be recorded. Accordingly, it is possible to urge the receiving party side to securely transmit the message, and the receiving party side can securely recognize the transmission timing of the message. Accordingly, the calling party side can securely receive the message created by the receiving party side.

In an eleventh aspect of the invention a facsimile machine having a telephone conversation function comprises a detector for detecting a call-ending signal generated in response to the receiving party side terminal releasing a communication line, and a phone-answering device for maintaining occupation of a communication line and for recording signal sounds transmitted through the communication line when the detector does not detect the call-ending signal after facsimile communication.

According to the eleventh aspect of the invention, when the detector does not detect the call-ending signal after facsimile communication, the phone-answering device maintains occupation of the communication line and records the signal sounds transmitted through the communication line. Thus, when the receiving party side requests a call, the phone-answering device can record a message from the receiving party side. Therefore, even when the calling party side or the receiving party side is not provided with a telephone conversation reservation function, and even when an error occurs during facsimile communication, the calling party side can securely record a message from the receiving party side after facsimile communication. Moreover, even when the calling party is away from the machine, the calling party can securely receive the message from the receiving party side.

In a twelfth aspect of the invention the phone-answering device transmits a predetermined message to the communication line before recording signal sounds transmitted through the communication line.

According to the twelfth aspect of the invention, when the detector does not detect the call-ending signal after facsimile communication, the phone-answering device transmits the predetermined message to the communication line, and records signal sounds transmitted through the communication line after the transmission of the predetermined message. Thus, when the receiving party side requests a call, the receiving party side can recognize that a message can be recorded, and the phone-answering device can record the message created by the receiving party side. Accordingly, it is possible to urge the receiving party side to securely transmit the message, and the receiving party side can securely recognize the transmission timing of the message.

BRIEF DESCRIPTION OF THE DRAWINGS

Other and further objects, features, and advantages of the invention will be more explicit from the following detailed description taken with reference to the drawings wherein:

FIG. 8 is a control sequence chart showing another example of operation control during facsimile communication at the facsimile machine;

FIG. 9 is a control sequence chart showing another example of operation control during facsimile communication at the facsimile machine;

FIG. 20 is a table illustrating general audible tones which are generated through the communication line.

DETAILED DESCRIPTION OF PREFERRED EMBODIMENT

A first embodiment of the present invention is described below referring to FIGS. 1 to 12.

Figure 1:
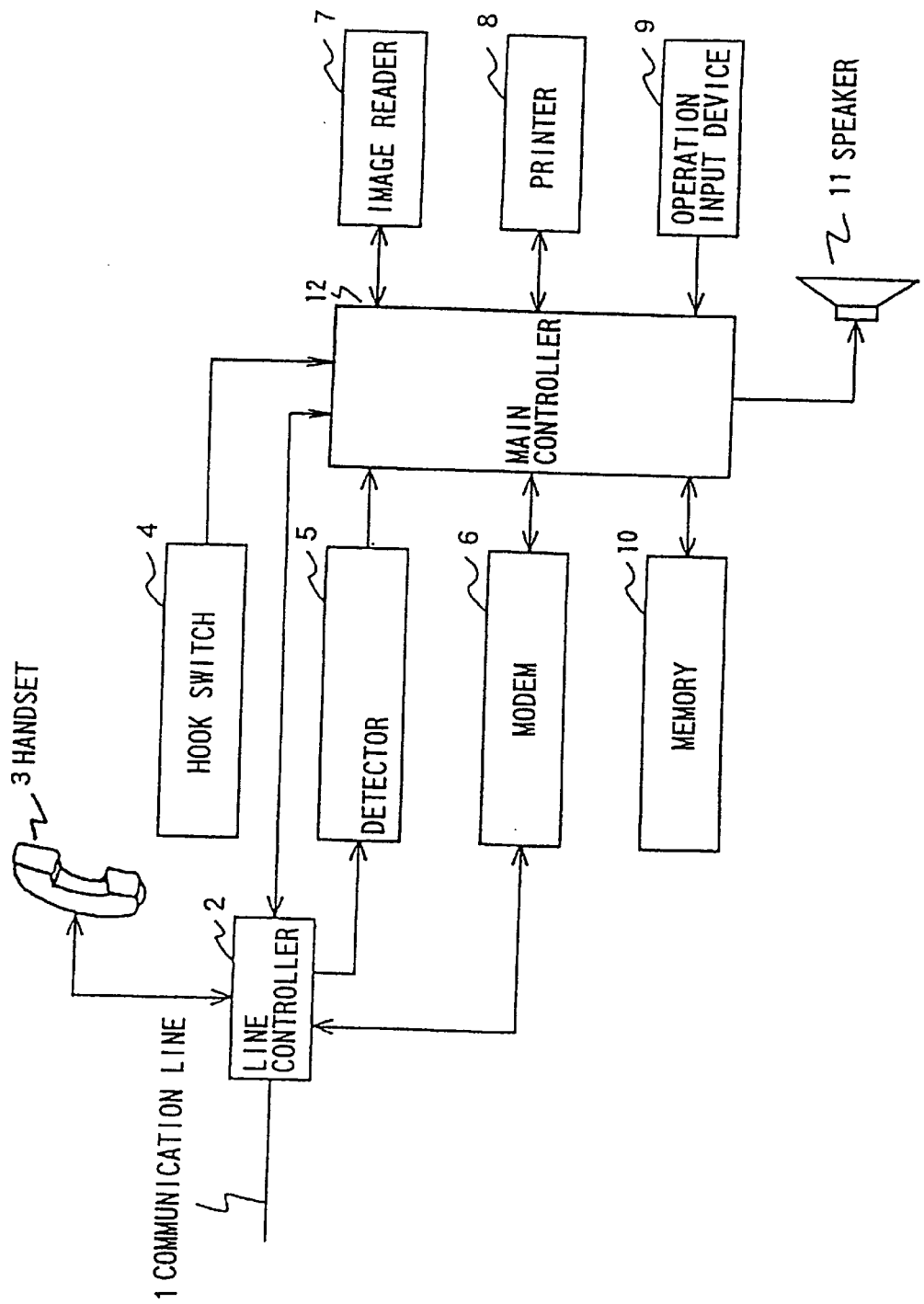
FIG. 1 is a schematic function block diagram showing an electric configuration of a facsimile machine in accordance with a first embodiment of the present invention.

Referring to FIG. 1, numeral 1 represents a communication line connected to a receiving party side facsimile machine via an exchanger (not shown). Numeral 2 represents a line controller for occupying/releasing the communication line 1 and for forming a communication path to the receiving party side facsimile machine via the occupied communication line 1 and an exchanger (not shown). Numeral 3 represents a handset for performing a call to the receiving side facsimile machine via the communication path formed by the line controller 2. Numeral 4 is a hook switch for detecting the on-hook/off-hook condition of the handset 3.

Numeral 5 represents a detector for detecting a call-ending signal generated in response to the receiving party side facsimile machine releasing a communication line 1 after ending conversation or communication (i.e., hanging up). When the receiving party's facsimile apparatus releases communication line 1, a call-ending signal is generated by a telephone exchange and is transmitted from the communication line 1 via line controller 2. FIG. 20 is a table illustrating general audible tones, wherein the call-ending signal is preferably presented as a busy-tone(BT). For example, and referring to FIG. 20, in Japan's NNT telephone exchange, the call-ending signal is a signal which repeats ON and OFF at intervals of 0.5 seconds (frequency: 400±20 Hz; impulse ratio: 60IPM±20%; make ratio: 50±10%, see for example, the BT data in FIG. 20).

The "end-of-call" is detected by a detector 5 as follows. When the detector 5 detects a repeat of ON and OFF at intervals of 0.5 seconds one or more predetermined times, and further detects a leading edge of the subsequent ON signal, the detector 5 judges that the signal, which comes from the communication line, is the call-ending signal.

Numeral 6 represents a modem for demodulating signals transmitted from the communication line 1 via the line controller 2 and for modulating signals to be transmitted to the communication line 1 via the line controller 2. Numeral 7 is an image reader for reading pictures and characters drawn on paper and for transmitting them as image data. Numeral 8 represents a printer for printing pictures and characters on predetermined paper on the basis of image data demodulated by the modem 6.

Numeral 9 represents an operation input device comprising function keys for instructing the start of facsimile reception and transmission, and numeric keys for entering telephone numbers of receiving party sides. Numeral 10 represents a memory for storing telephone numbers of receiving party sides, various setting conditions and predetermined program data. Numeral 11 represents a speaker for externally emitting sound by converting signals transmitted from the communication line 1 via the line controller 2.

Numeral 12 represents a main controller for performing line occupying/releasing control at the line controller 2, for performing reading control at the image reader 7, for performing printing control at the printer 8, for performing data reading/writing control at the memory 10 and for performing driving control at the speaker 11 on the basis of the detection results from the hook switch 4, the detection results from the detector 5, signals demodulated by the modem 6, operation instructions from the operation input device 9 and data stored in the memory 10.

Figure 2:
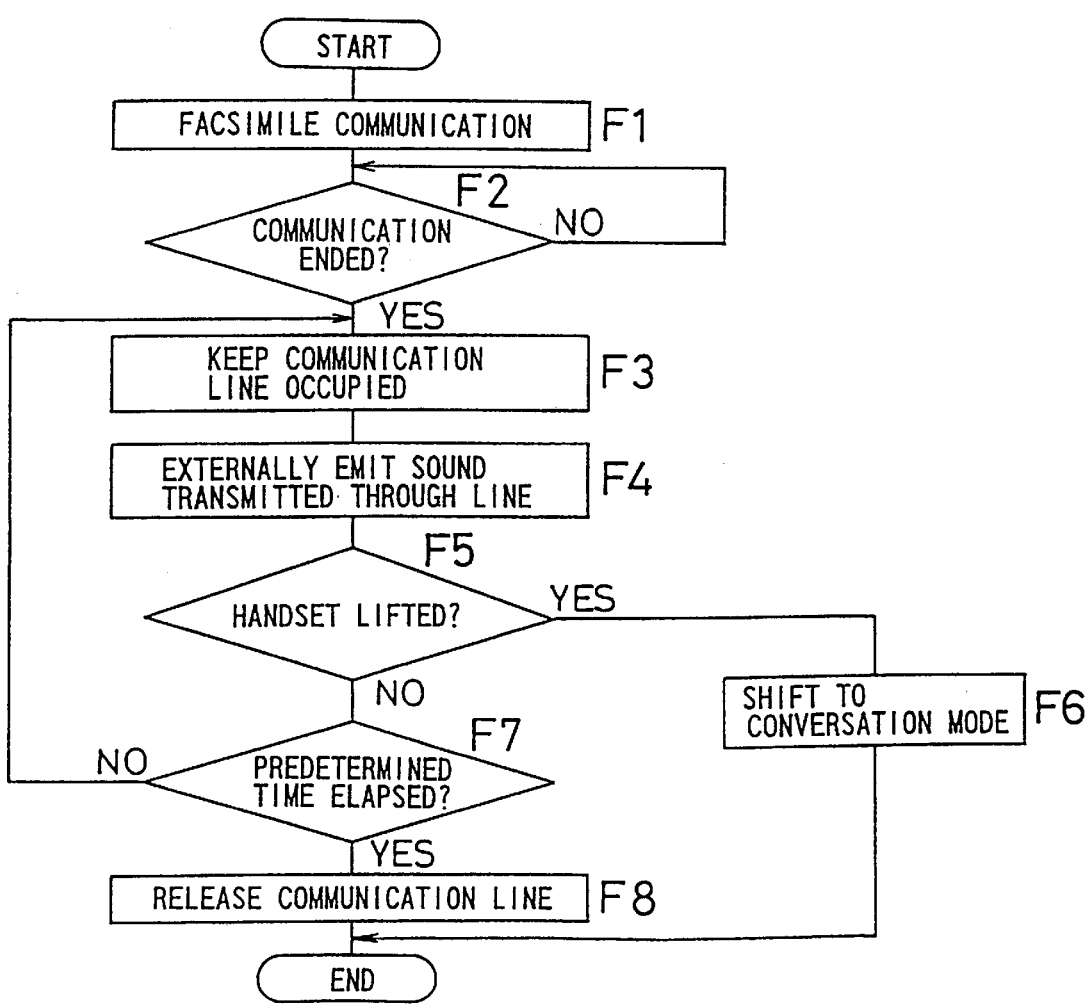
FIG. 2 is a flowchart showing an example of operation control during facsimile communication at the facsimile machine.
Figure 3:
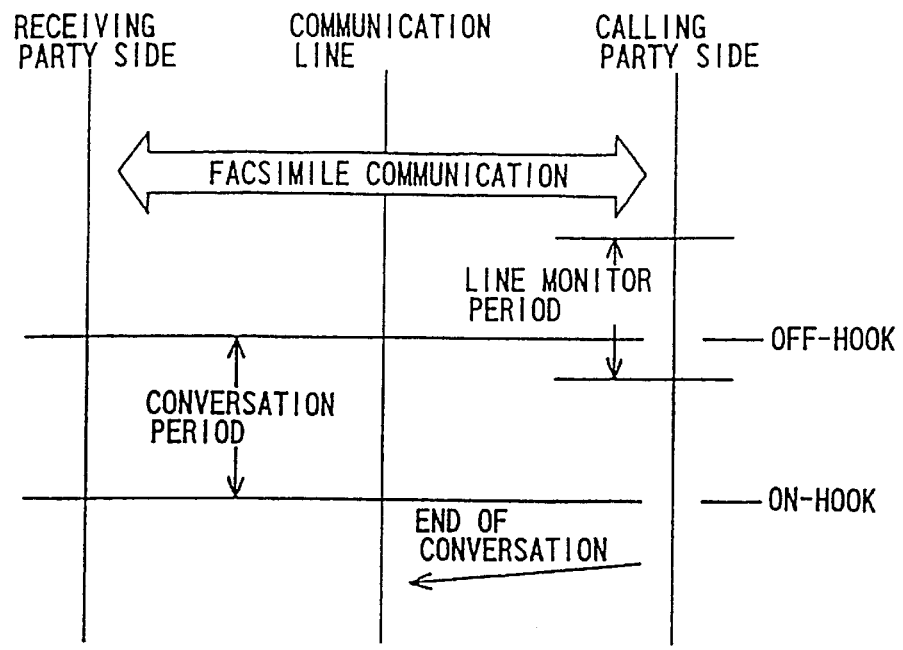
FIG. 3 is a control sequence chart showing an example of operation control during facsimile communication at the facsimile machine.
Figure 4:
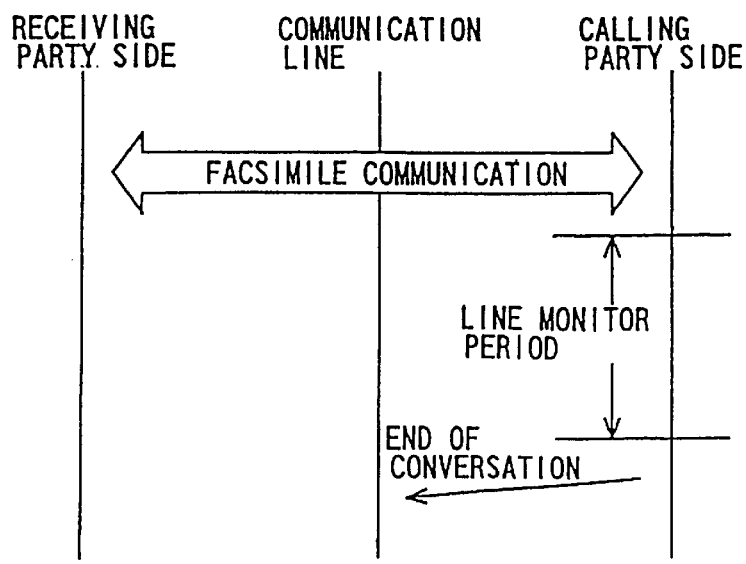
FIG. 4 is a control sequence chart showing an example of operation control during facsimile communication at the facsimile machine.

In the facsimile machine having the above-mentioned structure, an example of operation during facsimile communication is first described below referring to FIG. 1, a flow chart shown in FIG. 2, and timing charts shown in FIGS. 3 and 4.

When the calling party lifts the handset 3 and the lifting of the handset 3 is detected by the hook switch 4, the main controller 12 controls the line control circuit 2 to occupy the communication line 1. When the calling party then enters the telephone number of a receiving party side by operating the operation input device 9, the main controller 12 generates dial pulses or a DTMF signal corresponding to the signal from the operation input device 9, and transmits the dial pulses or the DTMF signal to the communication line 1 occupied by the line controller 2. After this, the receiving party side facsimile machine occupies the communication line 1 in response to the call by the calling party side facsimile machine. As a result, the calling party side facsimile machine is connected to the receiving party side facsimile machine. In this communication connection condition, predetermined signals are transmitted between the calling party side facsimile machine and the receiving party side facsimile machine, and facsimile communication starts.

In the condition wherein the calling party side facsimile machine is called by the receiving party side facsimile machine, and the speaker 11 externally emits a calling sound, when the calling party lifts the handset 3 and the lifting of the handset 3 is detected by the hook switch 4, the main controller 12 controls the line controller 2 to occupy the communication line 1. Accordingly, the calling party side facsimile machine is connected to the receiving party side facsimile machine. In this communication connection condition, predetermined signals are transmitted between the calling party side facsimile machine and the receiving party side facsimile machine, and facsimile communication starts.

Facsimile communication is started at step F1 by the above-mentioned operation control. In the case where image data to be transmitted is completely transmitted, or where a communication error occurs because of paper jamming at step F2, facsimile communication is judged to have been stopped (i.e., the transmission of predetermined signals between the calling party side facsimile machine and the receiving party side facsimile machine has not been completed). When communication is judged to have been stopped, the sequence proceeds to step F3, and the main controller 12 maintains the communication line 1 occupied by the line controller 2. At step F4, the signal sound on the communication line 1 having been kept occupied is externally emitted from the speaker 11.

At this time, depending on the signal sound on the communication line 1, which is externally emitted by the speaker 11, the calling party can recognize whether the receiving party requests a call or not. In other words, when a sound indicating the end of conversation is emitted from the speaker 11, the calling party can recognize that the receiving party does not request any call. When a calling sound, for example, other than the sound indicating the end of the conversation on the receiving party side is emitted or when no sound is emitted, the calling party can recognize that the receiving party requests a call.

At step F5, when the calling party recognizes that the receiving party requests a call and lifts the handset 3, the lifting of the handset 3 is detected by the hook switch 4, and the sequence proceeds to step F6. The main controller 12 controls the line controller 2 to enable conversation with the receiving party side facsimile machine whose handset 3 has been lifted and to stop communication operation.

On the other hand, at step F5 in the condition that the signal sound on the communication line 1 is externally emitted by the speaker 11, when the calling party does not lift the handset and a predetermined time elapses at step F7, the sequence proceeds to step F8. At step F8, the main controller 12 controls the line controller 2 to release the communication line 1 and to stop communication operation. If the predetermined time does not elapse at step F7, the sequence returns to F3.

In accordance with the above-mentioned operation control, when facsimile communication between the calling party side facsimile machine and the receiving party side facsimile machine is stopped in case image data to be transmitted is completely transmitted or when a communication error occurs because of paper jamming, the calling party can recognize whether the receiving party requests a call, and on the basis of this recognition the calling party can carry out conversation with the receiving party by performing simple operation.

Figure 5:
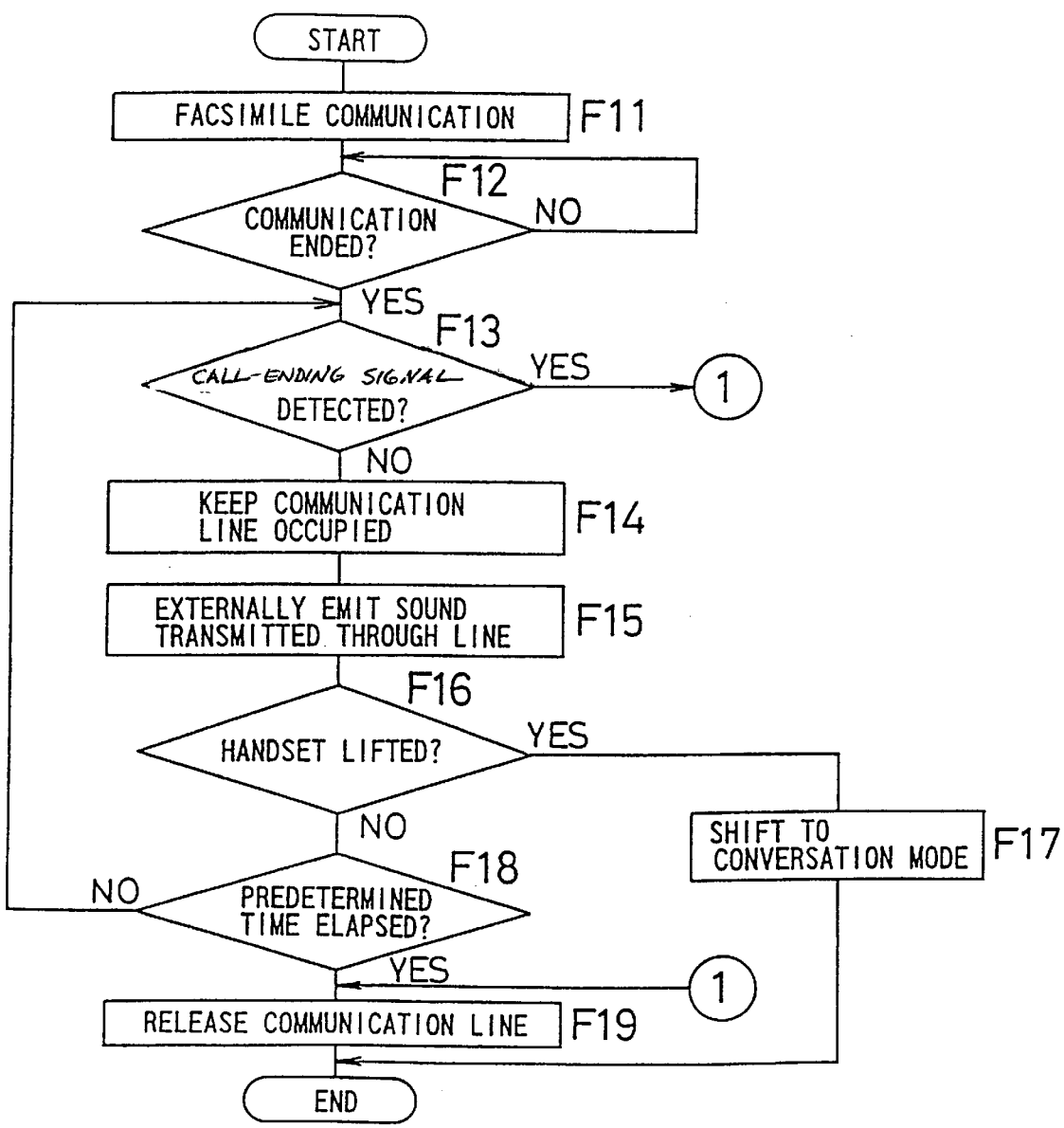
FIG. 5 is a flowchart showing another example of operation control during facsimile communication at the facsimile machine.
Figure 6:
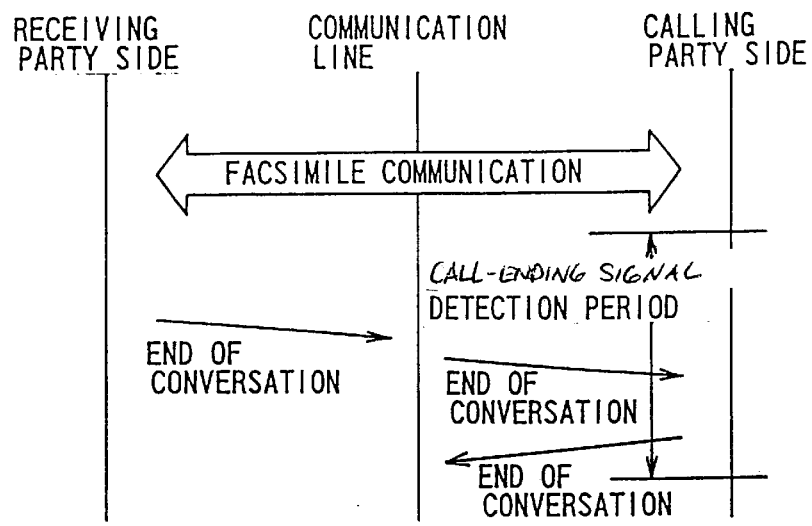
FIG. 6 is a control sequence chart showing another example of operation control during facsimile communication at the facsimile machine.
Figure 7:
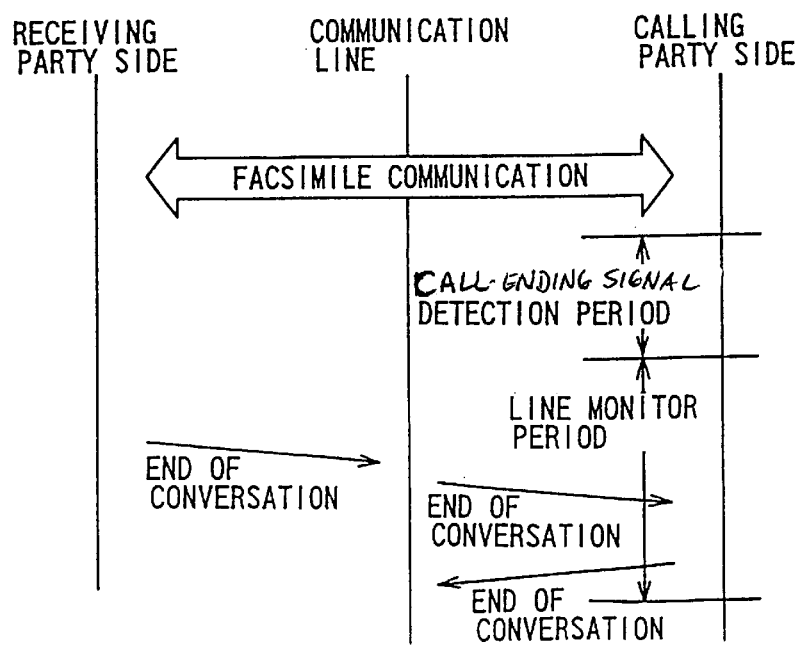
FIG. 7 is a control sequence chart showing another example of operation control during facsimile communication at the facsimile machine.

Next, another example of operation during facsimile communication in the facsimile machine having the above-mentioned structure is described below referring to a flowchart shown in FIG. 5 and control sequence charts shown in FIGS. 6 to 9.

After step F11 wherein facsimile communication is started, when facsimile communication is stopped through the transmission of predetermined signals between the calling party side facsimile machine and the receiving party side facsimile machine in case image data to be transmitted is completely transmitted, or when a communication error occurs because of paper jamming at step F12, the sequence proceeds to step F13. The main controller 12 judges whether a call-ending signal indicating that the receiving party side facsimile machine has released the communication line is detected by the detector 5, for example, the receiving party hung up to end communication or conversation, thereby generating the call-ending signal (BT signal) from the telephone exchange. When the main controller 12 judges that the receiving party has ended conversation on the basis of the call-ending signal being detected by detector 5, the sequence proceeds to step F19. At step F19, the main controller 12 controls the line controller 2 to release the communication line 1 and to stop communication operation. When the main controller 12 judges that the receiving party does not stop conversation (i.e., the BT/call-ending signal is not detected by detector 5), the sequence proceeds to step F14. At step F14, the line controller 2 keeps occupying the occupied communication line 1. At step F15, the signal sound on the occupied communication line 1 is externally emitted by the speaker 11.

At this time, the calling party can recognize whether the receiving party requests a call or not depending on whether the signal sound on the communication line 1 is externally emitted by the speaker 11 or not. In other words, when the receiving party ends conversation, it releases the communication line 1 to generate the call-ending signal which is transmitted in communication line 1. Only when the receiving party does not end conversation, (does not hang-up, for example) a calling sound, other than the sound indicating the end of the conversation (i.e., the BT of FIG. 20) is emitted from the speaker 11.

At step F16, in accordance with the signal sound on the communication line 1 emitted by the speaker 11, the calling party recognizes that the receiving party requests a call, and lifts the handset. When the lifting of the handset 3 is detected by the hook switch 4, the sequence proceeds to step F17. At step F17, the main controller 12 controls the line controller 2 to enable the conversation with the receiving party side facsimile machine via the handset 3 and to stop communication operation.

On the other hand, at step F16 in the condition that the signal sound on the communication line 1 is externally emitted by the speaker 11, when the calling party does not lift the handset and a predetermined time elapses at step F18, the sequence proceeds to step F19. At step F19, the main controller 12 controls the line controller 2 to release the communication line 1 and to stop communication operation. If the predetermined time does not elapse at step F18, the sequence returns to F13.

In accordance with the above-mentioned operation control, when facsimile communication between the calling party side facsimile machine and the receiving party side facsimile machine is stopped, such as in the case where image data to be transmitted is completely transmitted, or when a communication error occurs because of paper jamming, the calling party can recognize whether the receiving party requests a call, and on the basis of this recognition the calling party can carry out conversation with the receiving party by performing a simple operation.

Figure 10:
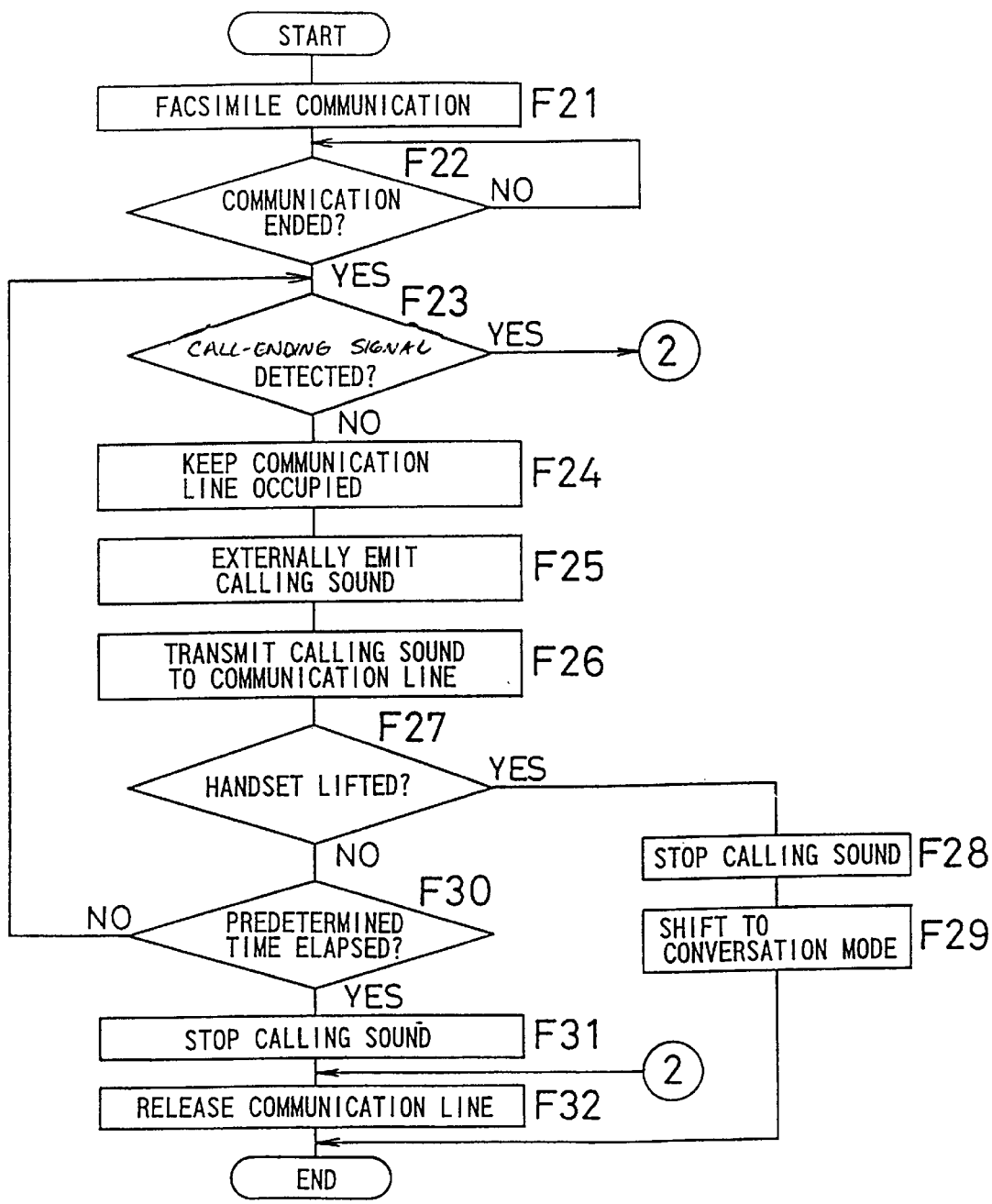
FIG. 10 is a flowchart showing still another example of operation control during facsimile communication at the facsimile machine.
Figure 11:
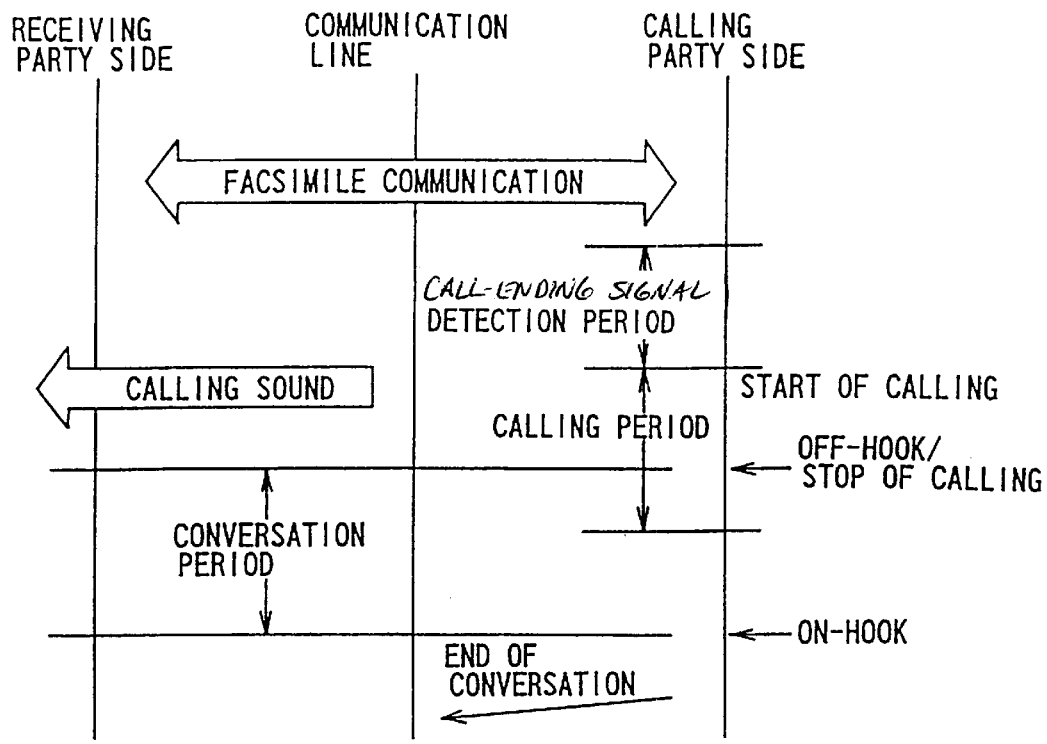
FIG. 11 is a control sequence chart showing still another example of operation control during facsimile communication at the facsimile machine.
Figure 12:
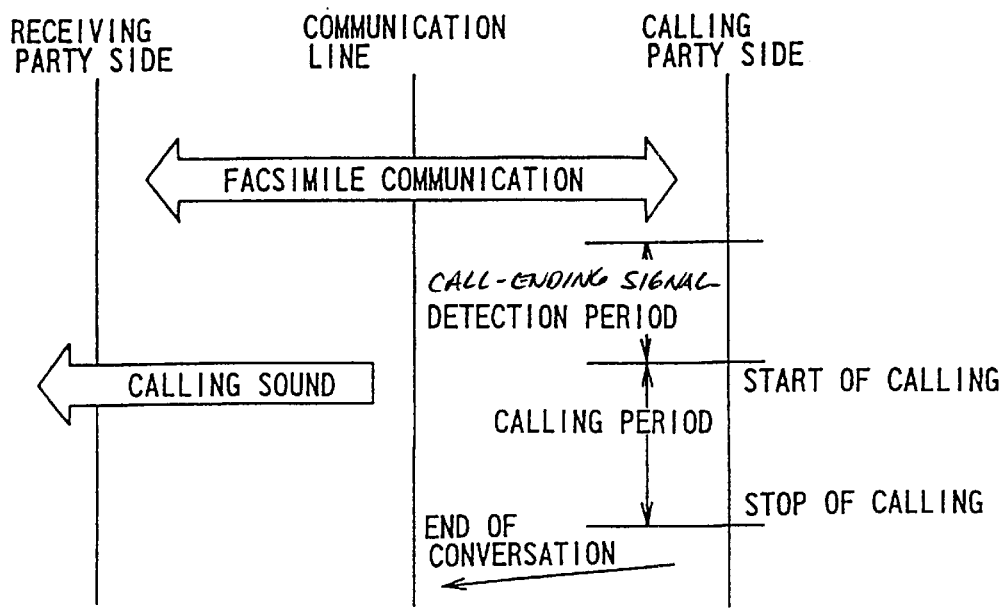
FIG. 12 is a control sequence chart showing still another example of operation control during facsimile communication at the facsimile machine.

Next, another example of operation during facsimile communication in the facsimile machine having the above-mentioned structure is described below referring to a flowchart shown in FIG. 10 and control sequence charts shown in FIGS. 11 and 12.

After step F21 wherein facsimile communication is started, when facsimile communication is stopped through the transmission of predetermined signals between the calling party side facsimile machine and the receiving party side facsimile machine as in the case where image data to be transmitted is completely transmitted, or when a communication error occurs because of paper jamming at step F22, the sequence proceeds to step F23. The main controller 12 judges whether a signal indicating the end of conversation on the receiving party side is detected by the detector 5. When the main controller 12 judges that the receiving party has ended conversation (released communication line 1) on the basis of the call-ending signal being detected by detector 5, the sequence proceeds to step F32. At step F32, the main controller 12 controls the line controller 2 to release the communication line 1 and stop communication operation. When the main controller 12 judges that the receiving party does not end conversation (i.e., the call-ending signal is not detected by detector 5), the sequence proceeds to step F24. At step F24, the line controller 2 maintains communication line 1. At step F25, a calling sound is generated and supplied to the occupied communication line 1 and the speaker 11, and transmitted to the receiving party side facsimile machine via the communication line 1. Furthermore, at step F26, the calling sound is externally emitted by the speaker 11.

At this time, depending on whether a calling sound is externally emitted by the speaker 11, the calling party can recognize whether the receiving party requests a call or not whether the receiving party can recognize if calling is carried out or not also depends on the calling sound transmitted from the communication line 1. The sound transmitted to the receiving side facsimile machine via the communication line 1 is not limited to the calling sound. Instead of emitting a calling sound, a message such as "Now, calling," may be transmitted. In addition, after transmitting such a message, a calling sound may also be transmitted.

At step F27, when the calling party recognizes that the receiving party requests a call based on the calling sound emitted by the speaker 11 and lifts the handset 3, the lifting of the handset 3 is detected by the hook switch 4, and the sequence proceeds to step F28. The main controller 12 stops generating the calling sound, and at step F29 controls the line controller 2 to enable conversation with the receiving party side facsimile machine via the handset 3 and to stop communication operation.

On the other hand, at step F27 in the condition that the calling sound is externally emitted by the speaker 11, when the calling party does not lift the handset and a predetermined time elapses at step F30, the sequence proceeds to step F31. At step F31, the main controller 12 stops generating the calling sound. At step F32, the main controller 12 controls the line controller 2 to release the communication line 1 and to stop communication operation. If the predetermined time does not elapse at step F30, the sequence returns to F23.

In accordance with the above-mentioned operation control, when facsimile communication between the calling party side facsimile machine and the receiving party side facsimile machine is stopped in case image data to be transmitted is completely transmitted or when a communication error occurs because of paper jamming, the calling party can recognize whether the receiving party requests a call. On the basis of this recognition, the calling party can then carry out conversation with the receiving party by performing a simple operation. In addition, the calling party can recognize that calling is performed on the receiving party side.

A second embodiment of the present invention is described below in reference to FIGS. 13 to 19.

The components shown in FIG. 13 and corresponding to those shown in FIG. 1 are represented by the same reference numerals, and not described below.

Figure 13:
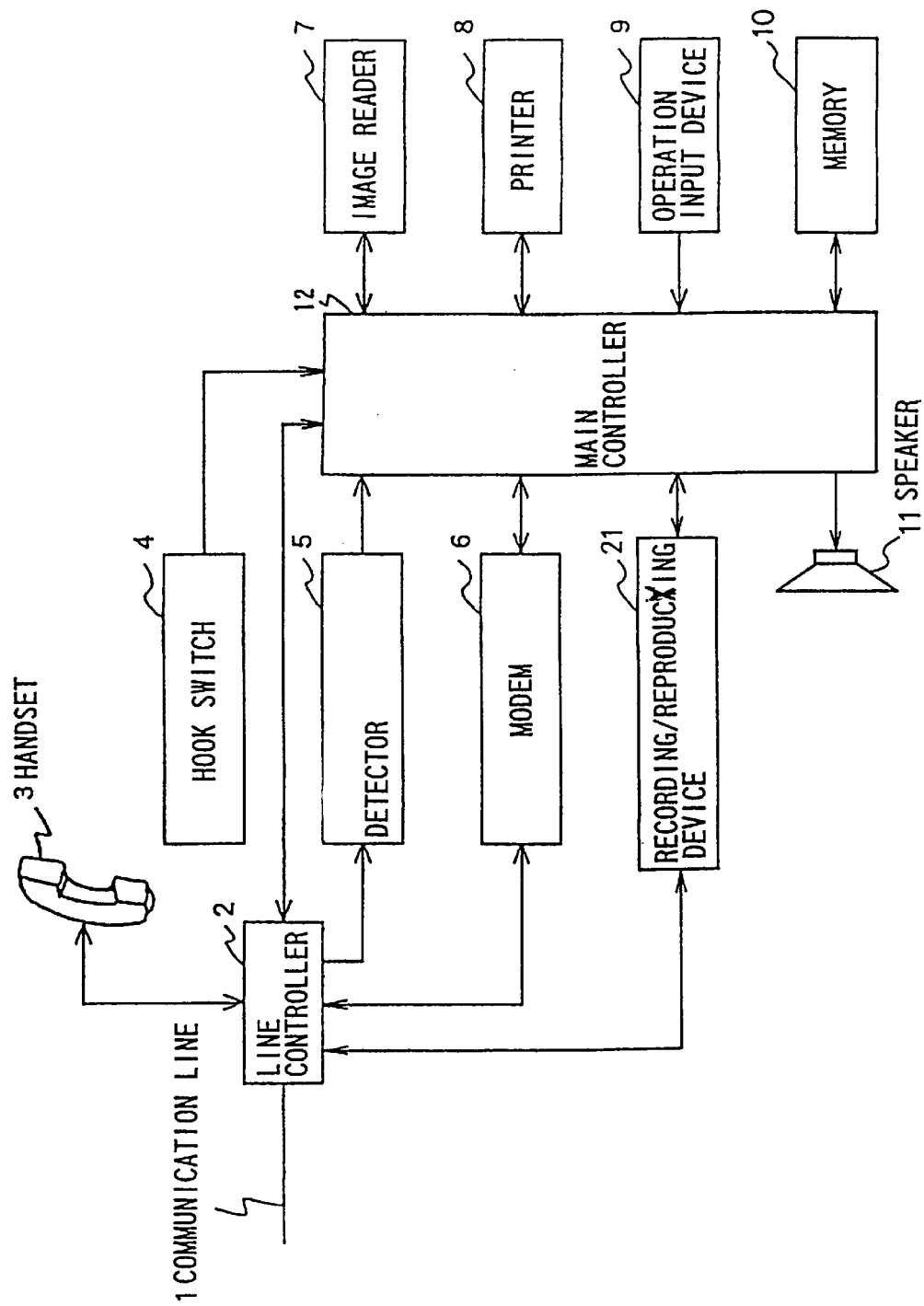
FIG. 13 is a schematic function block diagram showing an electric configuration of a facsimile machine in accordance with a second embodiment of the present invention.

In FIG. 13, numeral 21 represents a recording/reproducing device which records signals transmitted from the communication line 1 via the line controller 2 on the basis of operation control by the main controller 12, and reproduces the signals having been recorded or prerecorded.

Figure 14:
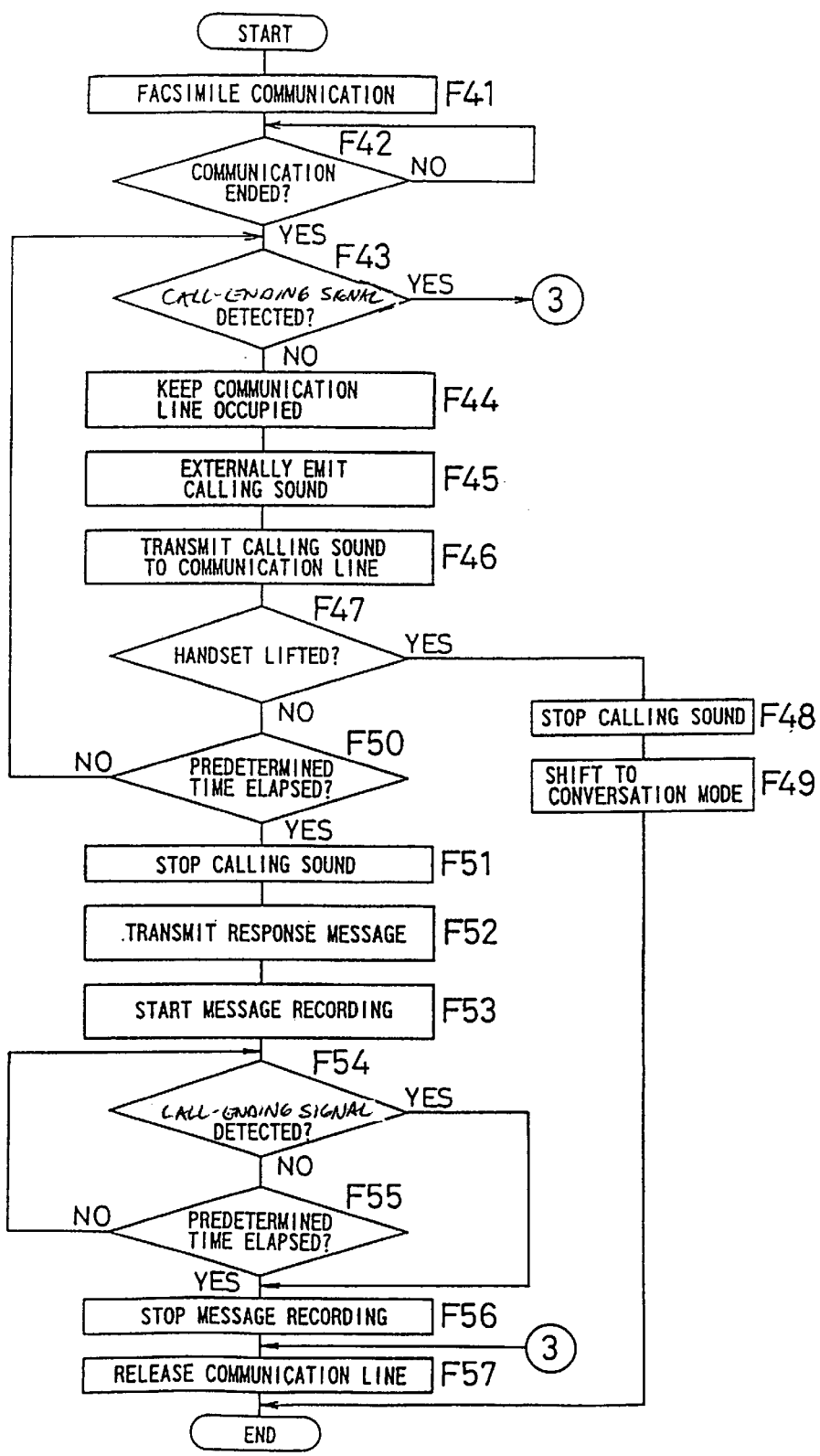
FIG. 14 is a flowchart showing an example of operation control during facsimile communication at the facsimile machine.
Figure 15:
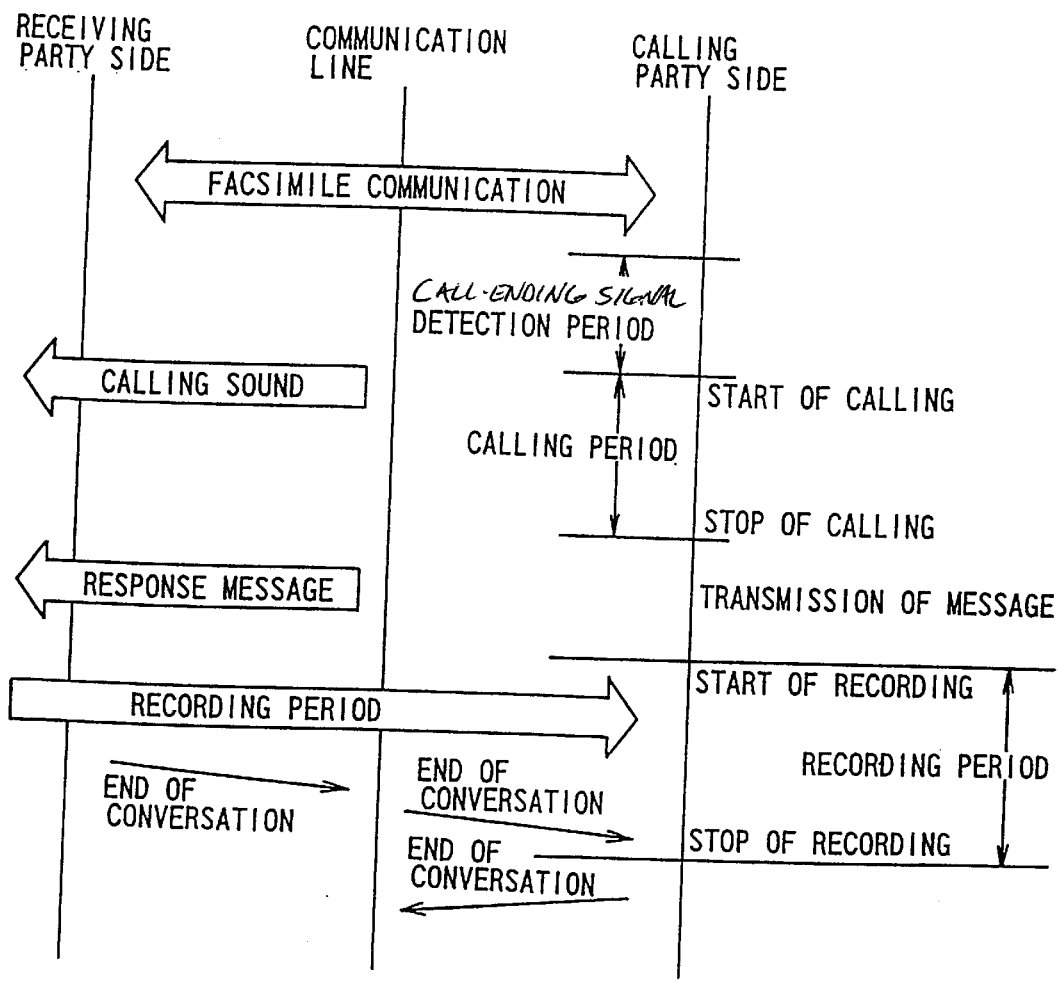
FIG. 15 is a control sequence chart showing an example of operation control during facsimile communication at the facsimile machine.
Figure 16:
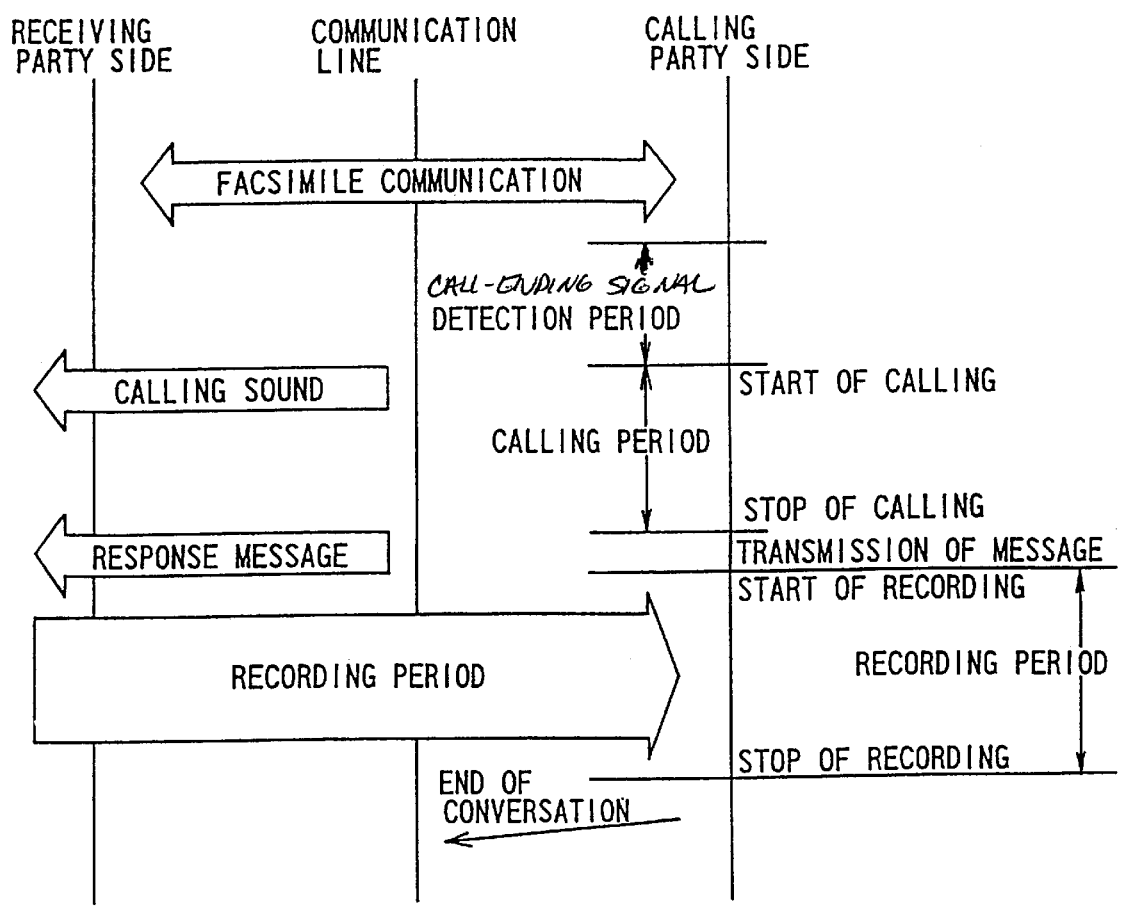
FIG. 16 is a control sequence chart showing an example of operation control during facsimile communication at the facsimile machine.

In the facsimile machine having the above-mentioned structure, an example of operation during facsimile communication is described below referring to a flowchart shown in FIG. 14 and control sequence charts shown in FIGS. 15 and 16.

After step F41 wherein facsimile communication is started, when facsimile communication is stopped through the transmission of predetermined signals between the calling party side facsimile machine and the receiving party side facsimile machine in the case where image data to be transmitted is completely transmitted, or where a communication error occurs because of paper jamming at step F42, the sequence proceeds to step F43. The main controller 12 judges whether a signal indicating the end of conversation on the receiving party side is detected by the detector 5. When the main controller 12 judges that the receiving party has ended conversation (released the communication line 1) which generates the call-ending (BT) signal that is detected by detector 5, the sequence proceeds to step F57. At step F57, the main controller 12 controls the line controller 2 to release the communication line 1 and to stop communication operation. When the main controller 12 judges that the receiving party does not end conversation, the sequence proceeds to step F44. At step F44, the line controller 2 maintains occupation of the communication line 1, and the sequence proceeds to step F45. At step F45, a calling sound is generated and supplied to the occupied communication line 1 and the speaker 11, and transmitted to the receiving party side facsimile machine via the communication line 1. The sequence proceeds to step F46. At step F46, the calling sound is externally emitted by the speaker 11.

At this time, depending on whether a calling sound is externally emitted by the speaker 11, the calling party can recognize whether the receiving party requests a call or not whether the receiving party can recognize if calling is carried out or not also depends on the calling sound transmitted from the communication line 1. The sound transmitted to the receiving side facsimile machine via the communication line 1 is not limited to the calling sound. Instead of emitting a calling sound, a message such as "Now, calling," may be transmitted. In addition, after transmitting such a message, a calling sound may also be transmitted.

At step F47, when the calling party recognizes that the receiving party requests a call based on the calling sound emitted by the speaker 11, the calling party lifts the handset 3. The lifting of the handset 3 is detected by the hook switch 4, and the sequence proceeds to step F48. At step F48, the main controller 12 stops generating the calling sound. At step F49, the main controller 12 controls the line controller 2 to enable conversation with the receiving party side facsimile machine via the handset 3 and to stop communication operation.

On the other hand, in the condition at step 45 where the calling sound is externally emitted by the speaker 11, if the calling party does not lift the handset at step 47 and a predetermined time elapses at step F50, the sequence proceeds to step F51. At step F51, the main controller 12 stops generating the calling sound. At step F52, the main controller 12 controls the recording/reproducing device 21 so that a message, such as "Nobody is around here. Please leave your message.", which indicates the start of message recording and, having been recorded in the recording/reproducing device 21, is emitted and transmitted to the communication line 1 having been kept occupied. At step F53, the recording/reproducing device 21 starts recording a message transmitted from the communication line 1. If the predetermined time does not elapse at step F50, the sequence returns to F43.

After the start of recording the message, when the main controller 12 judges that the receiving party has released the communication line (ended conversation) by detection of the generated call-ending signal by detector 5 at step F54, or when the main controller 12 judges that a predetermined time has elapsed at step F55, the sequence proceeds to step F56. At step F56, the main controller 12 controls the recording/reproducing device 21 to stop recording the message. At step 57, the main controller 12 controls the line controller 2 to release the communication line 1 and to stop communication operation. If the predetermined time does not elapse at step F55, the sequence returns to F54.

In accordance with the above-mentioned operation control, when facsimile communication between the calling party side facsimile machine and the receiving party side facsimile machine is stopped as in the case where image data to be transmitted is completely transmitted, or where a communication error occurs because of paper jamming, the calling party can recognize whether the receiving party requests a call. Even when the receiving party requests a call, which is not responded to by the calling party, the calling party notifies the receiving party that it is not responding. After this, a message from the receiving party can be recorded.

Figure 17:
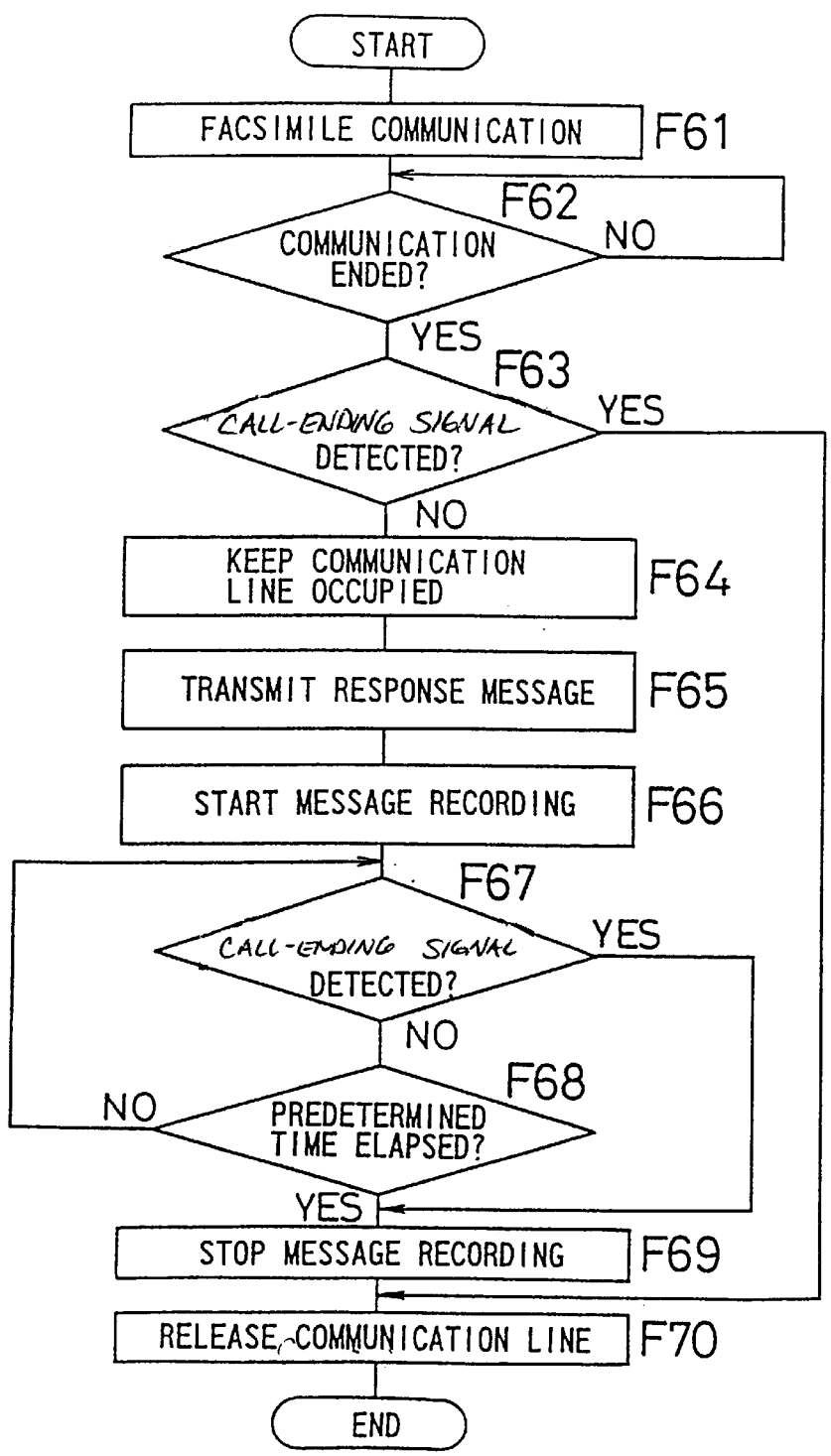
FIG. 17 is a flowchart showing another example of operation control during facsimile communication at the facsimile machine.
Figure 18:
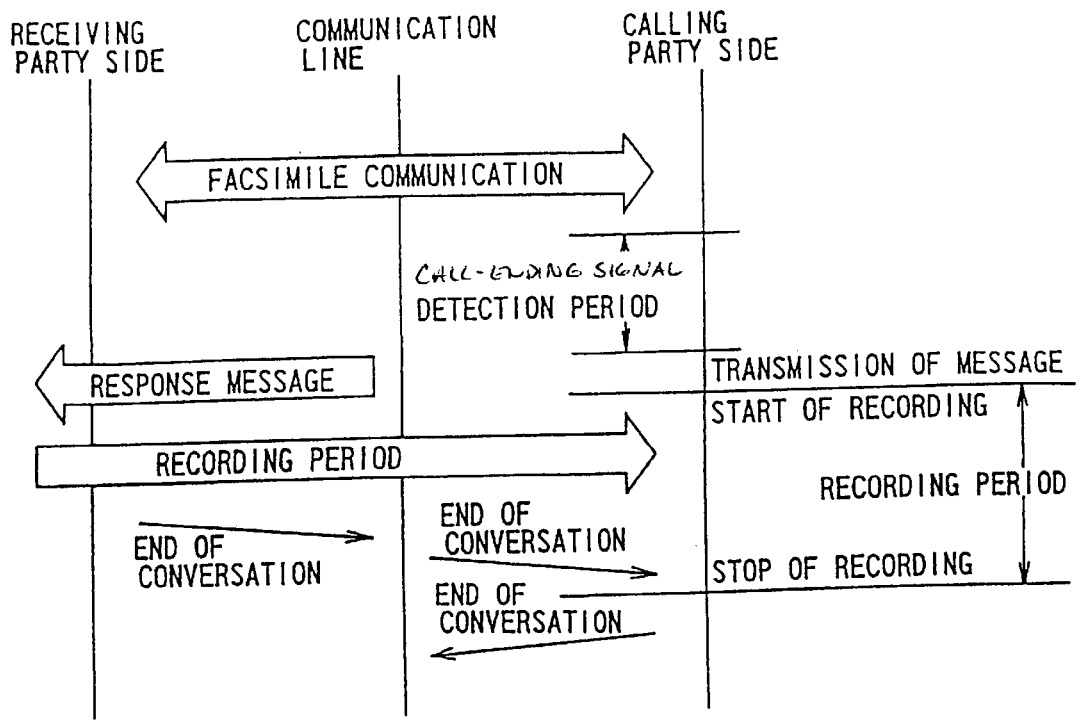
FIG. 18 is a control sequence chart showing another example of operation control during facsimile communication at the facsimile machine.
Figure 19:
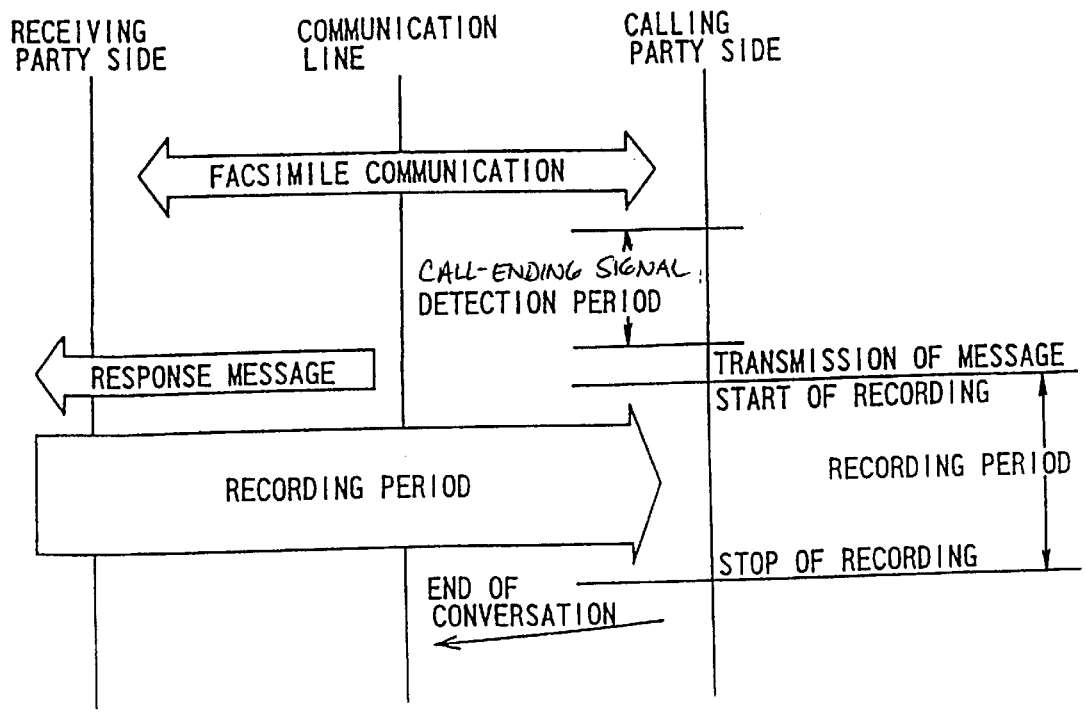
FIG. 19 is a control sequence chart showing another example of operation control during facsimile communication at the facsimile machine.

In the facsimile machine having the above-mentioned structure, another example of operation during facsimile communication is described below referring to a flowchart shown in FIG. 17 and control sequence charts shown in FIGS. 18 and 19.

After step F61 wherein facsimile communication is started, when facsimile communication is stopped through the transmission of predetermined signals between the calling party side facsimile machine and the receiving party side facsimile machine in the case where image data to be transmitted is completely transmitted, or where a communication error occurs because of paper jamming at step F62, the sequence proceeds to step F63. The main controller 12 judges whether a call-ending signal generated in response to the receiving party side releasing the communication line 1 (which ends conversation or communication) is detected by detector 5 from the communication line 1 occupied by the line controller 2. When the main controller 12 judges that the receiving party has ended conversation (i.e., hung-up) on the basis of the detection of the call-ending signal by detector 5, the sequence proceeds to step F70. At step F70, the main controller 12 controls the line controller 2 to release the communication line 1 and to stop communication operation. When the main controller 12 judges that the receiving party does not end conversation (detector 5 does not detect the call-ending signal), the sequence proceeds to step F64. At step F64, the line controller 2 keeps occupying the occupied communication line 1. At step F65, the main controller 12 controls the recording/reproducing device 21 so that a message, such as "Please leave your message." indicating the start of recording a message and prerecorded in the recording/reproducing device 21 is generated and transmitted to the communication line 1 having been kept occupied. At step F66, the recording/reproducing device 21 starts recording a message transmitted from the communication line 1.

After the start of recording the message, when the main controller 12 judges that the receiving party has ended conversation on the basis of call-ending signal being detected by detector 5 at step F67, or when the main controller 12 judges that a predetermined time has elapsed at step F68, the sequence proceeds to step F69. At step F69, the main controller 12 controls the recording/reproducing device 21 to stop recording the message. At step 70, the main controller 12 controls the line controller 2 to release the communication line 1 and to stop communication operation. If the predetermined time does not elapse at step F68, the sequence returns to F67.

In accordance with the above-mentioned operation control, when facsimile communication between the calling party side facsimile machine and the receiving party side facsimile machine is stopped in case image data to be transmitted is completely transmitted or when a communication error occurs because of paper jamming, and when the receiving party requests a call, a message can be recorded from the receiving party.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A facsimile machine having a telephone conversation function, comprising:

a detector for detecting a call-ending signal generated in response to a receiving party side terminal releasing a communication line, a sound emitter for externally emitting a signal sound transmitted through the communication line, and a controller for maintaining occupation of the communication line when said detector fails to detect said call-ending signal after facsimile communication, and for controlling the sound emitter to externally emit the signal sound transmitted through the communication line, alerting a calling party that the said receiving party is requesting a call.

2. A facsimile machine having a telephone conversation function, comprising:

a detector for detecting a call-ending signal generated in response to a receiving party side terminal releasing a communication line, a calling device for externally emitting a calling sound, and a controller for maintaining occupation of the communication line when said detector fails to detect said call-ending signal after facsimile communication, and for controlling the calling device to externally emit the calling sound.

3. The facsimile machine of claim 2, further comprising:

a sound output device for outputting a sound indicating that the calling party is being called, wherein said controller maintains said communication line occupied until said detector detects the call-ending signal generated in response to the receiving party side terminal releasing the communication line.

4. The facsimile machine of claim 2, wherein said controller transmits a calling sound generated by the calling device, until said detector detects the call-ending signal generated in response to the receiving party side terminal releasing the communication line.

5. The facsimile machine of claims 2 or 4, wherein when the telephone conversation function is not activated after said detector fails to detect said call-ending signal, said controller releases the communication line after a lapse of a predetermined time, and controls the calling device to stop generating the calling sound.

6. The facsimile machine of claim 3, wherein when the telephone conversation function is not activated after said detector fails to detect said call-ending signal, said controller releases the communication line after a lapse of a predetermined time, and controls the sound output device to stop the sound output.

7. The facsimile machine of claims 2 or 4, further including:

a phone-answering device for recording signal sounds transmitted through the communication line, wherein when the telephone conversation function is not activated after said detector fails to detect said call-ending signal, said controller controls the calling device to stop generating the calling sound, and controls the phone-answering device to record signal sounds transmitted through the communication line.

8. The facsimile machine of claim 3, further including a phone-answering device for recording signal sounds transmitted through the communication line, wherein when the telephone conversation function is not activated after said detector fails to detect said call-ending signal, said controller controls the sound output device to stop delivering the sound output, and controls the phone-answering device to record signal sounds transmitted through the communication line.

9. The facsimile machine of claim 7, wherein the phone-answering device sends a predetermined message to the communication line before recording signal sounds transmitted through the communication line.

10. The facsimile machine of claim 8, wherein the phone-answering device sends a predetermined message to the communication line before recording signal sounds transmitted through the communication line.

11. A facsimile machine having a telephone conversation function, comprising:

a detector for detecting a call-ending signal generated in response to a receiving party side terminal releasing a communication line, and a phone-answering device for maintaining occupation of the communication line when said detector fails to detect said call-ending signal from the receiving party side after facsimile communication, enabling recording of a message received from said receiving party.

12. The facsimile machine of claim 11, wherein the phone-answering device transmits a predetermined message to the communication line before recording signal sounds transmitted through the communication line.

* * * * *